United States Patent
Hubert et al.

(10) Patent No.: US 6,931,521 B2
(45) Date of Patent: Aug. 16, 2005

(54) DATA PROCESSING APPARATUS GENERATES INITIALIZATION SCHEDULE BY SORTING MODULE ORDER ACCORDING TO NUMBER OF ITS DEPENDENCIES FOR INITIALIZING DATA AFFECTING EXECUTION OF OPERATIONAL INSTRUCTIONS

(75) Inventors: Patrick Hubert, Montreal (CA); Fabrice Jaubert, Montreal (CA)

(73) Assignee: Autodesk Canada Inc., Quebec (CA)

( * ) Notice: Subject to any disclaimer, the term of this patent is extended or adjusted under 35 U.S.C. 154(b) by 819 days.

(21) Appl. No.: 09/940,202

(22) Filed: Aug. 27, 2001

(65) Prior Publication Data

US 2002/0147903 A1 Oct. 10, 2002

(30) Foreign Application Priority Data

Apr. 10, 2001 (GB) ............................................. 0108953

(51) Int. Cl.⁷ .......................... G06F 15/177; G06F 1/24
(52) U.S. Cl. .......................................... 713/1; 713/100
(58) Field of Search ................................. 713/1, 2, 100

(56) References Cited

U.S. PATENT DOCUMENTS

| | | | | |
|---|---|---|---|---|
| 5,109,510 A | * | 4/1992 | Baker et al. ................. | 718/104 |
| 5,627,949 A | | 5/1997 | Letcher, Jr. | |
| 5,819,088 A | * | 10/1998 | Reinders ...................... | 717/149 |
| 5,859,846 A | * | 1/1999 | Kim et al. .............. | 370/395.62 |
| 6,052,707 A | * | 4/2000 | D'Souza ...................... | 718/106 |
| 6,496,503 B1 | * | 12/2002 | Pelissier et al. ............. | 370/389 |
| 6,546,485 B1 | * | 4/2003 | Tsunedomi et al. .......... | 713/100 |
| 6,691,118 B1 | * | 2/2004 | Gongwer et al. ........... | 701/100 |
| 6,718,533 B1 | * | 4/2004 | Schneider et al. ........... | 717/100 |

FOREIGN PATENT DOCUMENTS

| | | |
|---|---|---|
| EP | 0543588 A2 | 5/1993 |
| EP | 1096374.2 A2 | 5/2001 |

OTHER PUBLICATIONS

IBM Technical Disclosure Bulletin, vol. 34, No. 6, Nov. 1991, "Representing domain–dependent data in an object–oriented system", pp. 291–300.

* cited by examiner

*Primary Examiner*—Chun Cao
(74) *Attorney, Agent, or Firm*—Gates & Cooper LLP

(57) ABSTRACT

A method of initializing application instructions on a processing system. An application (602) comprises a number of dynamically shared objects or modules. Each of these modules may include data structures (614) that require initialization. Modules are dependent upon each other, and a module initialization order is identified by automatically registering a module's dependencies in an initialization list (608) during module loading, processing module dependencies to identify all dependencies, and generating an initialization schedule (609). Module initialization (506) is then performed. Plug-in modules can be loaded and initialized after the application has started, and the plug-in schedule is appended to the initialization schedule. Finalization is performed in reverse order, when the application is closed.

30 Claims, 20 Drawing Sheets

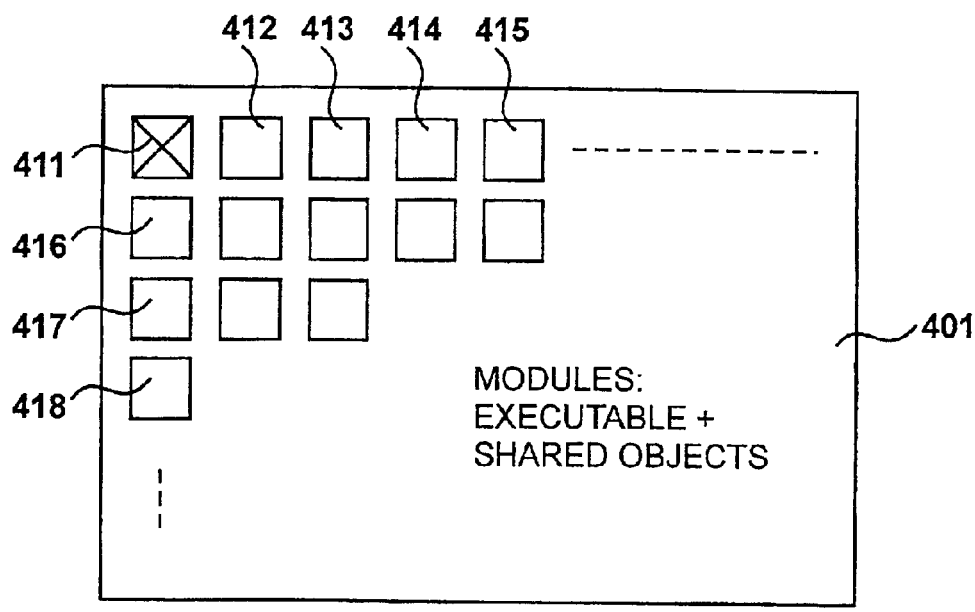
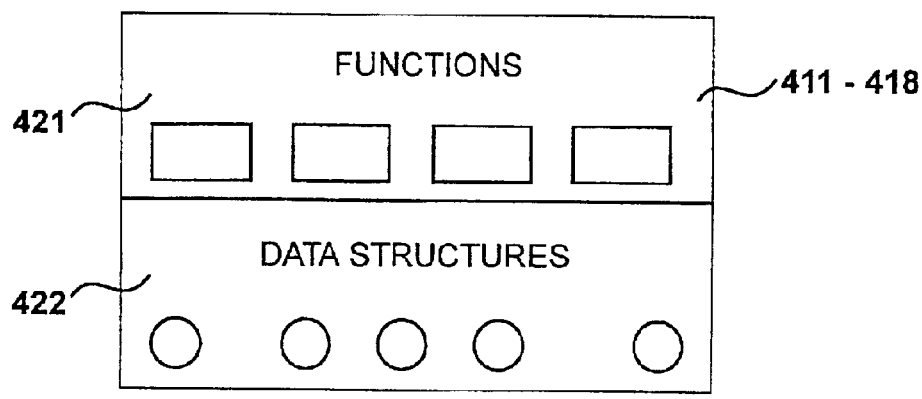
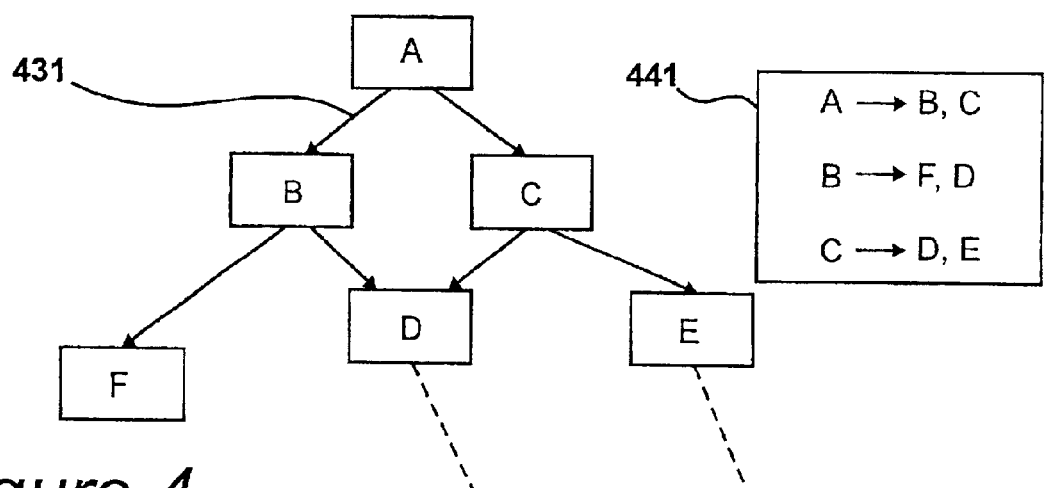
*Figure 4*

```
// Filename: foo.cpp include <database.h>
include <osal.h>
include <initialize.h> include "foo.h"

// Static objects                          /801

InInit<foo> _instance;    //registration object

// Constructor for registration object
                                           /802
InInit<foo>::InInit () {

// Registering Dependencies
   addDependency(InInit<database>::getType());actual call pattern;
   registerDependency(typeInfo(InInit<osal>).typeID());
   registerDependency(typeInfo(InInit<initialize>).typeID());

}
   Module initialisation and finalisation functions
   InInit<foo>::performInitialise()
            () {         ~803

// whatever initialisation this module requires

}
   void InInit<foo>::performFinalize()
                            /804
        () {

// whatever finalisation this module requires

}

// All other module functions from this point on ...
```

Figure 8

INITIALISATION SCHEDULE

| MODULE | DEPENDENCIES | RANK |
|--------|--------------|------|
| G | 1 | 1 |
| B | 5 | 2 |
| F | 8 | 3 |
| C | 9 | 4 |
| K | 9 | 5 |
| J | 11 | 6 |
| H | 14 | 7 |
| I | 14 | 8 |
| D | 15 | 9 |
| E | 17 | 10 |
| L | 21 | 11 |
| A | 23 | 12 |

```
// Filename: main.cpp include <fastmath.h>
include <osal.h>
include <initialize.h> include "main.h"

// Static objects

InInit<main> _instance; //registration object

// Constructor for registration object

InInit<main>::InInit () { registerDependency(typeInfo(InInit<fastmath>).typeID());
    registerDependency(typeInfo(InInit<osal>).typeID());
    registerDependency(typeInfo(InInit<initialize>).typeID());

}
main() {
            InitGuard  ig;                      1901
                    1902

// the rest of the main function goes here
        1903
}

// Other functions, include initialise() and finalise()
// go here ...
```

Figure 19

```
InitGuard : : InitGuard () {

InInitManager.initialize () ;

```
void loadPlugin () {
        2101
        ReInitGuard rig;

dlopen ("Plugin1");
        dlopen ("Plugin2");
        2102
}
```

*Figure 21*

```
ReInitGuard : : ReInitGuard () {

ReInitManager.initialize () ;

DATA PROCESSING APPARATUS GENERATES INITIALIZATION SCHEDULE BY SORTING MODULE ORDER ACCORDING TO NUMBER OF ITS DEPENDENCIES FOR INITIALIZING DATA AFFECTING EXECUTION OF OPERATIONAL INSTRUCTIONS

FIELD OF THE INVENTION

The present invention relates to initialising a plurality of modules of processing instructions prior to execution of an application running on a computer.

INTRODUCTION TO THE INVENTION

All processing devices, whether they be personal computers, personal digital assistants or embedded processors, suffer from complexity. The speed and capacity of processing and data storage devices has shifted the limits from hardware to application instructions.

The complexity of many applications is such that it is no longer possible to consider a set of application instructions as ever being finished. Instead, the source code for these instructions evolves over time, improving and following changing user requirements over a product lifetime of many years. Even in the short term, application instructions may change from day to day. In order to deal with this constant evolution, and to minimise the problems of managing complexity, it is established good engineering practice for applications to comprise a large number of small sets of instructions or modules. Individual teams of engineers can work on modules separately, and this permits parallel evolution of several aspects of application behaviour. Theoretically, any complex application can be broken down into sufficiently small individual modules so that complexity, at the module level, never becomes a limiting factor. However, as the number of modules increases, the problem of combining them to work together becomes more difficult. In the art, it is this problem which places an upper limit on the complexity of reliable application evolution.

A particular difficulty when combining modules in an application, is module initialisation, which has to occur before the main application processing begins. In order to avoid this problem, engineers have to keep application complexity as low as possible, while still fulfilling the application requirements.

In certain environments, such as complex power generation plants, application size and complexity cannot be avoided, and so it is possible for very significant difficulties to occur, when attempting to provide a reliable and fault free control system. Less critical, but of significance nevertheless to many users of processing systems, is the reliability of applications used continuously and widely in the workplace, such as word processing systems, or even operating systems. Furthermore, Internet and telecommunications systems are significantly complex, and increasing amounts of financial and other valuable data are transferred over them. Functional flaws in this environment are, in effect, security flaws which may be exploited.

SUMMARY OF THE INVENTION

It is an object of the present invention to provide an improved method of initialising an application comprising a large number of application modules.

According to an aspect of the invention, there is provided apparatus for processing data, comprising processing means and memory means for storing data and instructions for processing said data. The memory means includes application instructions and data that define an initialisation manager and a plurality of application modules. Each of the application modules includes a registration object for registering dependency of said module upon others of said application modules, to said initialisation manager. Each application module further includes operational instructions defining operations of said module used by other modules; and at least two of said application modules include initialisation instructions for initialising data affecting execution of said operational instructions. The initialisation manager includes instructions for performing the steps of: (a) processing said registered module dependencies to identify a dependency count for each module; (b) generating an initialisation schedule by sorting the module order according to the number of dependencies; and (c) calling said initialisation instructions in the order defined by said initialisation schedule.

BRIEF DESCRIPTION OF THE SEVERAL VIEWS OF THE DRAWINGS

FIG. 4 summarises application modularity as it relates to the present invention;

FIG. 8 illustrates C++ source code used to generate the registration object shown in FIG. 6;

FIG. 14 details the initialisation schedule shown in FIG. 6;

FIG. 19 illustrates C++ source code for a key section of the main executable module of the application; and FIG. 20 illustrates C++ code used to implement aspects of the initialisation process shown in FIG. 5.

FIG. 21 illustrates C++ code used to load a re-initialisation object rig.

FIG. 22 illustrates C++ code used to call the destructor of re-initialisation object rig.

DETAILED DESCRIPTION OF THE PREFERRED EMBODIMENT

FIG. 1

Figure 1:
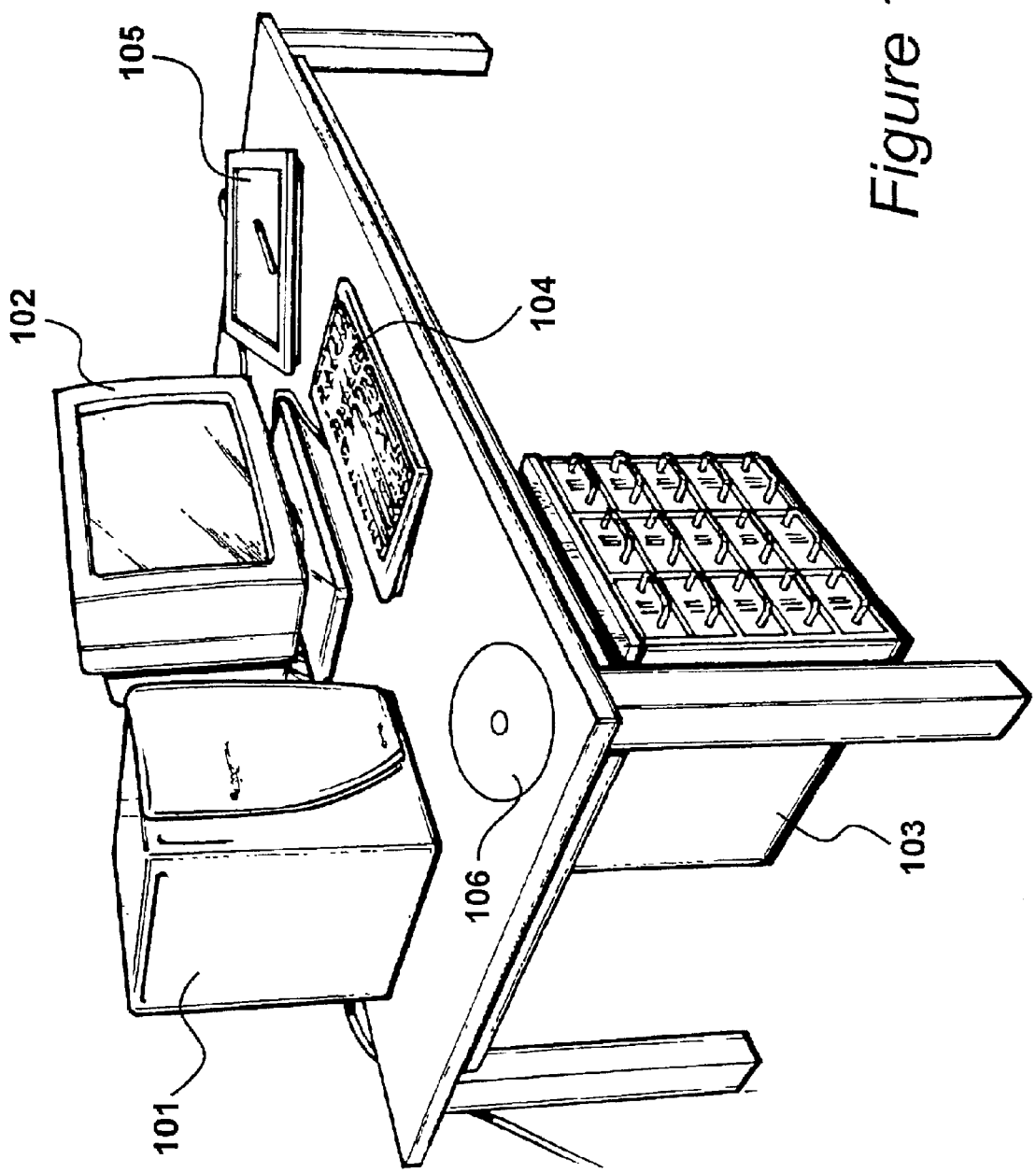
FIG. 1 shows an image processing system, including a computer and a monitor.

A system for processing image and other data is illustrated in FIG. 1. A processing system 101, such as an Octane™ produced by Silicon Graphics Inc., supplies image signals to a video display unit 102. Moving image data is stored on a redundant array of inexpensive discs (RAID) 103. The RAID is configured in such a way as to store a large volume of data, and to supply this data at a high bandwidth, when required, to the processing system 101. The operator controls the processing environment formed by the processing system 101, the video monitor 102 and the RAID 103, by means of a keyboard 104, and a stylus-operated graphics tablet 105. The processing system shown in FIG. 1 is optimal for the purpose of processing image and other high bandwidth data. In such a system, the instructions for controlling the processing system are complex. The invention relates to any computer system where processing instructions are of significant complexity.

Instructions controlling the processing system 101 may be installed from a physical medium such as a CDROM or DVD disk 106, or over a network, including the Internet. These instructions enable the processing system 101 to interpret user commands from the keyboard 104 and the graphics tablet 105, such that image data, and other data, may be viewed, edited and processed.

FIG. 2

Figure 2:
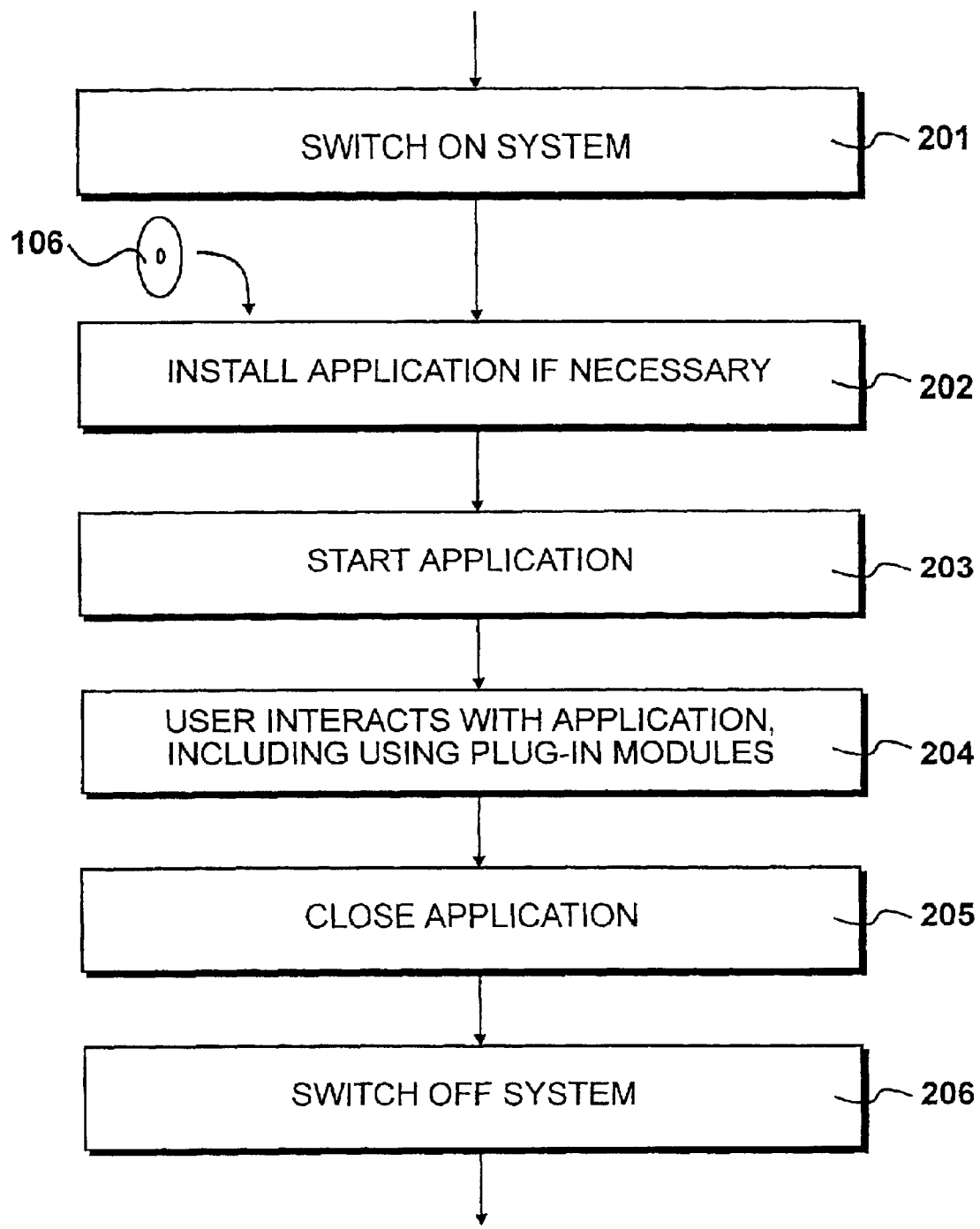
FIG. 2 summarises actions performed on the processing system shown in FIG. 1, including a step of starting the application, a step of using the application with plug-ins and a step of closing down the application.

User operations of the system shown in FIG. 1 are summarised in FIG. 2. At step 201 the user switches on the computer system. At step 202 application instructions for controlling the processing system 101 are installed if necessary. These instructions may be installed from a CDROM or DVD 106, or via a network, possibly the Internet. At step 203 the user interacts with the processing system 101 in such a way as to start the application instructions. At step 204 the user interacts with the application now running on the processing system 101. These interactions include the loading and saving of files.

Files of various formats may be loaded and saved. Each file format has a specific set of instructions for loading and saving. Where a large number of formats is to be loaded and saved, instructions for all formats are not loaded simultaneously. Instead, instructions for format loading and/or saving are only loaded when the user initiates an action that explicitly requires them. Instructions of this kind are sometimes referred to as plug-ins, reflecting the fact that a user can obtain such instructions and make them available to the main application according to his or her specific needs.

Plug-ins may provide a broad variety of functionality. In image processing, various types of image filtering, enhancement and modification can be performed by algorithms available as plug-ins. Furthermore, the main application instructions and additional plug-ins need not be written by the same author; they merely need to conform to a standard application programming interface.

At step 205 the user closes the application, and at step 206 the processing system 101 is switched off.

FIG. 3

Figure 3:
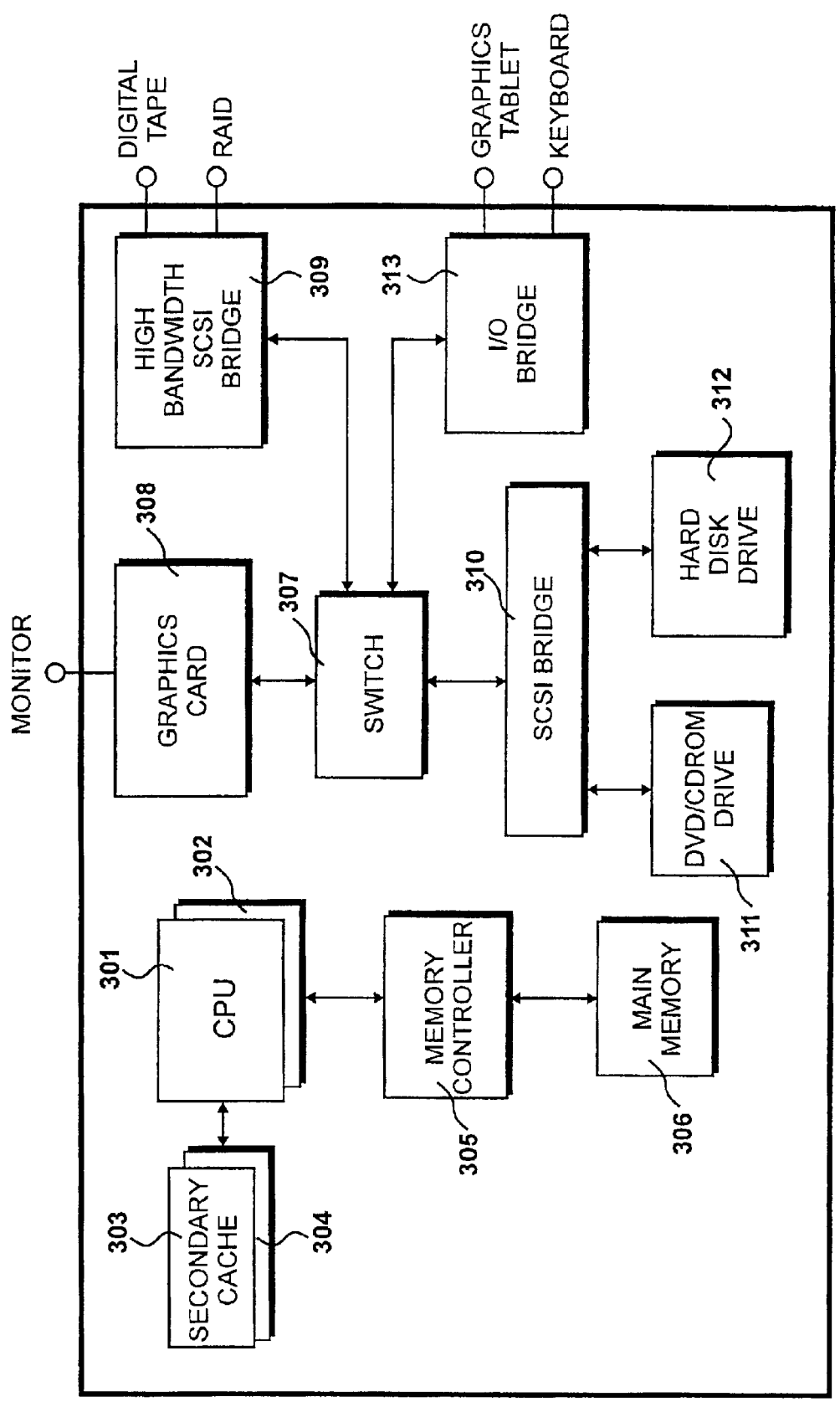
FIG. 3 details the components of the processing system shown in FIG. 1, including a main memory.

The processing system 101 shown in FIG. 1 is detailed in FIG. 3. The processing system comprises two central processing units 301 and 302 operating in parallel. Each of these processors is a MIPS R12000 manufactured by MIPS Technologies Incorporated, of Mountain View, Calif. Each of these processors 301 and 302 has a dedicated secondary cache memory 303 and 304 that facilitate per-CPU storage of frequently used instructions and data. Each CPU 301 and 302 further includes separate primary instruction and data cache memory circuits on the same chip, thereby facilitating a further level of processing improvement. A memory controller 305 provides a common connection between the processors 301 and 302 and a main memory 306. The main memory 306 comprises two gigabytes of dynamic RAM.

The memory controller 305 further facilitates connectivity between the aforementioned components of the processing system 101 and a high bandwidth non-blocking crossbar switch 307. The switch makes it possible to provide a direct high capacity connection between any of several attached circuits. These include a graphics card 308. The graphics card 308 generally receives instructions from the processors 301 and 302 to perform various types of graphical image rendering processes, resulting in images, clips and scenes being rendered in real time on the monitor 102. A high bandwidth SCSI bridge 309 provides an interface to the RAID 103, and also, optionally, to a digital tape device, for use as backup.

A second SCSI bridge 310 facilitates connection between the crossbar switch 307 and a DVD/CDROM drive 311. The DVD drive provides a convenient way of receiving large quantities of instructions and data, and is typically used to install instructions for the processing system 101 onto a hard disk drive 312. Once installed, instructions located on the hard disk drive 312 may be fetched into main memory 306 and then executed by the processors 301 and 302. An input output (I/O) bridge 313 provides an interface for the graphics tablet 105 and the keyboard 104, through which the user is able to provide instructions to the processing system 101.

Application instructions running on the processing system 101 are complex. Whether the application is a word processor, image editor or a digital film editor, the instructions that define the application's functionality typically run into hundreds of thousands, if not several millions, of individual binary instructions for the processors 301 and 302. Definition of these instructions is achieved by the use of a high level language such as C++, which is compiled into binary machine code compatible with the intended target processor. However, the use of a high level language, while reducing the effort required to define instructions, still does not solve the complexity problem entirely. As high level languages have become more sophisticated, this has allowed engineers to create more complex applications. The requirement of organisation still imposes a limit upon the complexity that application instructions can achieve. This complexity is minimised by splitting up an application into a large number of modules.

FIG. 4

A particular difficulty encountered when combining modules in a single application is that of module initialisation. In FIG. 4, an illustration is shown of the relationships between modules that lead to this difficulty. An application 401 comprises an executable module 411 and several other modules 412 to 418. The modules 412 to 418 are dynamically loaded shared objects. Under Unix type operating systems, such as Irix™ and Linux™, dynamically shared objects are usually abbreviated as dso's. They are also known simply as shared objects. Under Windows™ operating systems, dso's are known as dynamically loaded libraries, or dll's. The executable module 411 defines the starting point of the application instructions 401, while the other modules 412 to 418 provide additional functionality that is invoked via the executable 411.

Each module 411 to 418 includes instructions 421, in the form of several functions 421, and data structures 422. There are two types of data that it is necessary to consider. The first type of data is user data, supplied usually from files on the hard disk 312, and which is to be created, manipulated and stored by the application. User data includes word processing files, text files, image files and so on. However, from an engineer's perspective a second type of data exists, which has an effect on the behaviour of the application, and the functions 421 within each module. These types of data are indicated at 422.

An example of this type of data is a mathematical function which is required to calculate a sine function at high speed. A look up table includes a number of pre-calculated results, thus reducing significantly the time required for the function to execute. Thus a data structure affects a function in a module. In some implementations the data structure is created when the application starts, by invoking an initialisation function prior to the start of the main application. In order for the application to function correctly, it is essential for the sine function to be initialised before the application begins. This is an example where data structures 422 within modules must be initialised.

A second requirement for initialisation is when hardware components of the processing system 101 are to be initialised. For example, the graphics card 308 has the potential to operate in a variety of display modes. The application may require a particular mode to operate. In order to do this, a graphics interface module 417 can be used to interrogate the graphics card 308 and determine which of its available modes is suitable for the application. The graphics card is then instructed to operate in the selected mode. Thereafter, many other modules will require information about the selected graphics mode in order to function correctly within the overall context of the application. This is an example of a requirement for hardware initialisation, which also results in data structures being initialised, that represent the behaviour and characteristics of the graphics card so that other modules may function in an appropriate way.

Various types of modules require initialisation, although it is possible that some modules will require none. The situation is made complex by the fact that the order in which modules are initialised is important. For example, if the fast sine function's characteristics are dependent upon the graphics resolution set on the graphics card, it will be necessary for the graphics module to be initialised before the module containing the sine function. In an application comprising ninety or so separate modules, sufficient dependency of this sort exists, that defining the order of initialisation is extremely difficult to achieve. A dependency graph is illustrated at 431, in which module A is dependent upon modules B and C, module B dependent upon modules D and F and so on. This may be represented as a dependency list, as shown at 441.

As the application modules undergo daily evolution, through modification and/or improvement, these dependencies change also. However, this requires the engineers working on an individual module to be aware of the network of dependencies, and therefore of the overall structure of the application. In the art, the order of initialisation of modules is determined manually by an engineer or engineers, who then write instructions to perform initialisation in the appropriate order. This process is sufficiently complex that trial and error may often be used to determine the most reliable initialisation order. This leads to a reduction in reliability, since it is possible that an incorrect initialisation order will only be exposed by a crash that occurs under very rare conditions.

This is how instruction modularity reaches its complexity limit. Above a certain number of modules, the requirement to identify the initialisation order becomes impossible to meet reliably. The reduction in complexity achieved by splitting the application into modules only works for applications below a certain size, or for applications comprising modules that do not have to be initialised in any particular order. Without these restrictions, application quality and reliability are compromised.

FIG. 5

Figure 5:
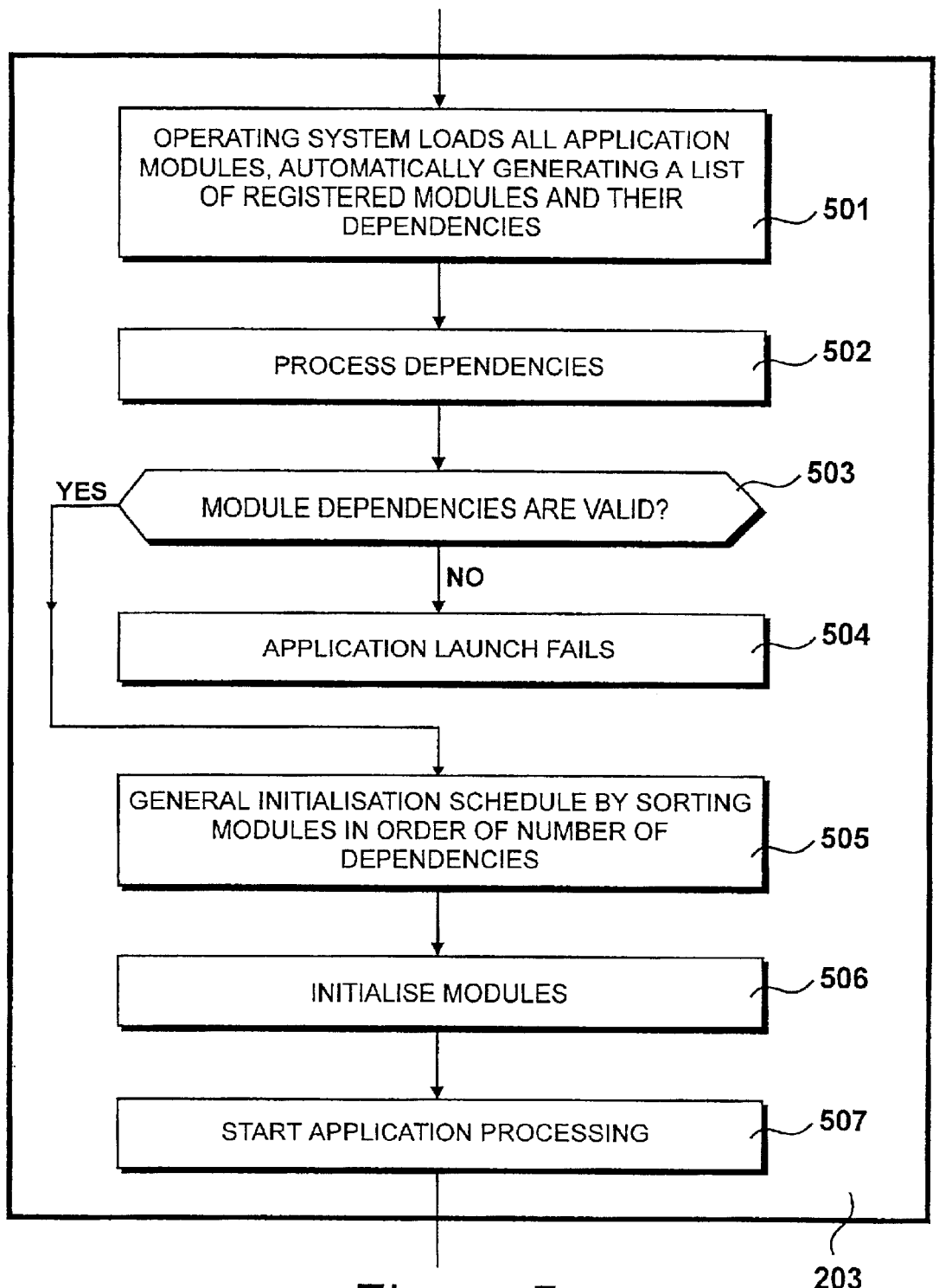
FIG. 5 summarises the invention, detailing the step of starting an application, shown in FIG. 2, including a step of loading all application modules, a step of processing dependencies, a step of generating an initialisation schedule and a step of initialising modules.

A preferred embodiment of the invention is summarised in FIG. 5, which highlights the step 203, of FIG. 2, in which the application is started. At step 501 an operating system running on the processing system 101 performs loading of all application modules. As a result of this process, each module is registered in a list, along with its dependencies. At step 502 the dependencies are processed. At step 503, a question is asked as to whether the module dependencies are valid. This condition is known as a result of the processing carried out in step 502. If the dependencies are not valid, control is directed to step 504, at which point the application launch is cancelled. Alternatively, control is directed to step 505.

At step 505 an initialisation schedule is generated by sorting the modules in order of the number of their dependencies. In this step, the number of dependencies is higher than that provided by the list of registered modules at step 501. This increment is the result of dependency processing performed in step 502. At step 506 the modules are initialised in the order defined by the initialisation schedule, and at step 507 the post-initialisation application processing begins.

FIG. 6

Figure 6:
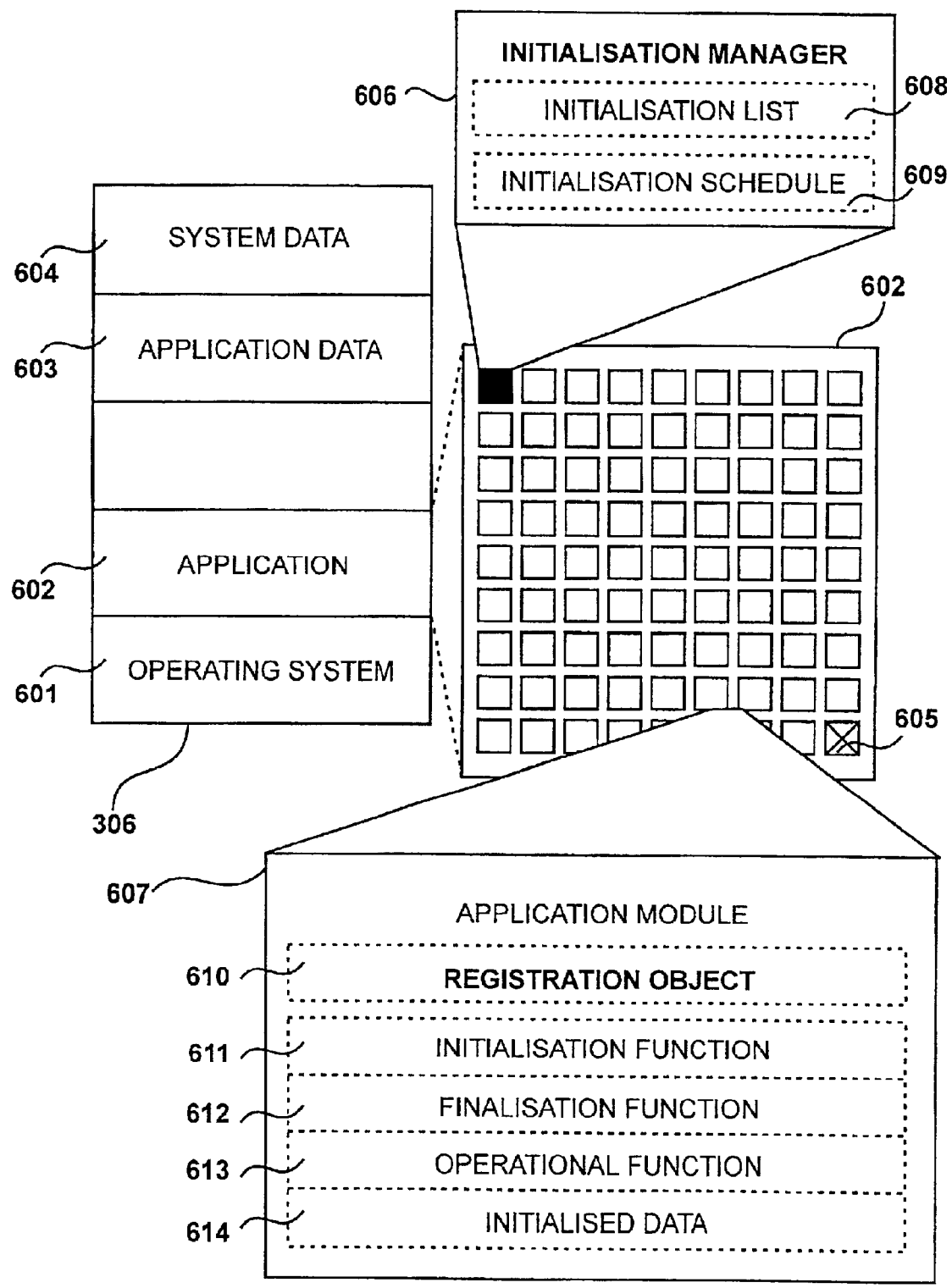
FIG. 6 details the contents of the main memory shown in FIG. 3, including an initialisation list, an initialisation schedule, and a registration object.

As a result of the processing performed by the steps in FIG. 5, the contents of main memory 306 are as shown in FIG. 6. The operating system that performed the loading resides in main memory as indicated at 601. The application is also resident in main memory as indicated at 602. Application data 603 includes data loaded by default for the application, possibly including image data, and other data that the application will process, display and or modify. System data 604 includes data used by the operating system 601. The operating system is Irix™, available from Silicon Graphics Inc.

The application 602 comprises around eighty to ninety application modules, including an executable 605 and an initialisation manager 606. The initialisation manager 606 and an example application module 607 are shown in detail. The initialisation manager includes an initialisation list 608 and an initialisation schedule 609. These are generated as a result of the steps shown in FIG. 5. The application module 607 includes a registration object 610, an initialisation function 611 and a finalisation function 612. Operational functions 613 include all the main operations carried out by the module 607 that are not related to initialisation. These functions 611, 612 and 613 comprise sets of instructions that are executable on the processors 301 and 302. Initialised data 614 includes data in the module 607 that affects the operation of its functions 613. Initialised data has to be initialised by the initialisation function 611 before the operational functions 613 can be used. Not all modules necessarily require initialisation, but it is assumed that they do, so as not to restrict the evolution of the application as these types of functions are added freely to modules as required.

FIG. 7

Figure 7:
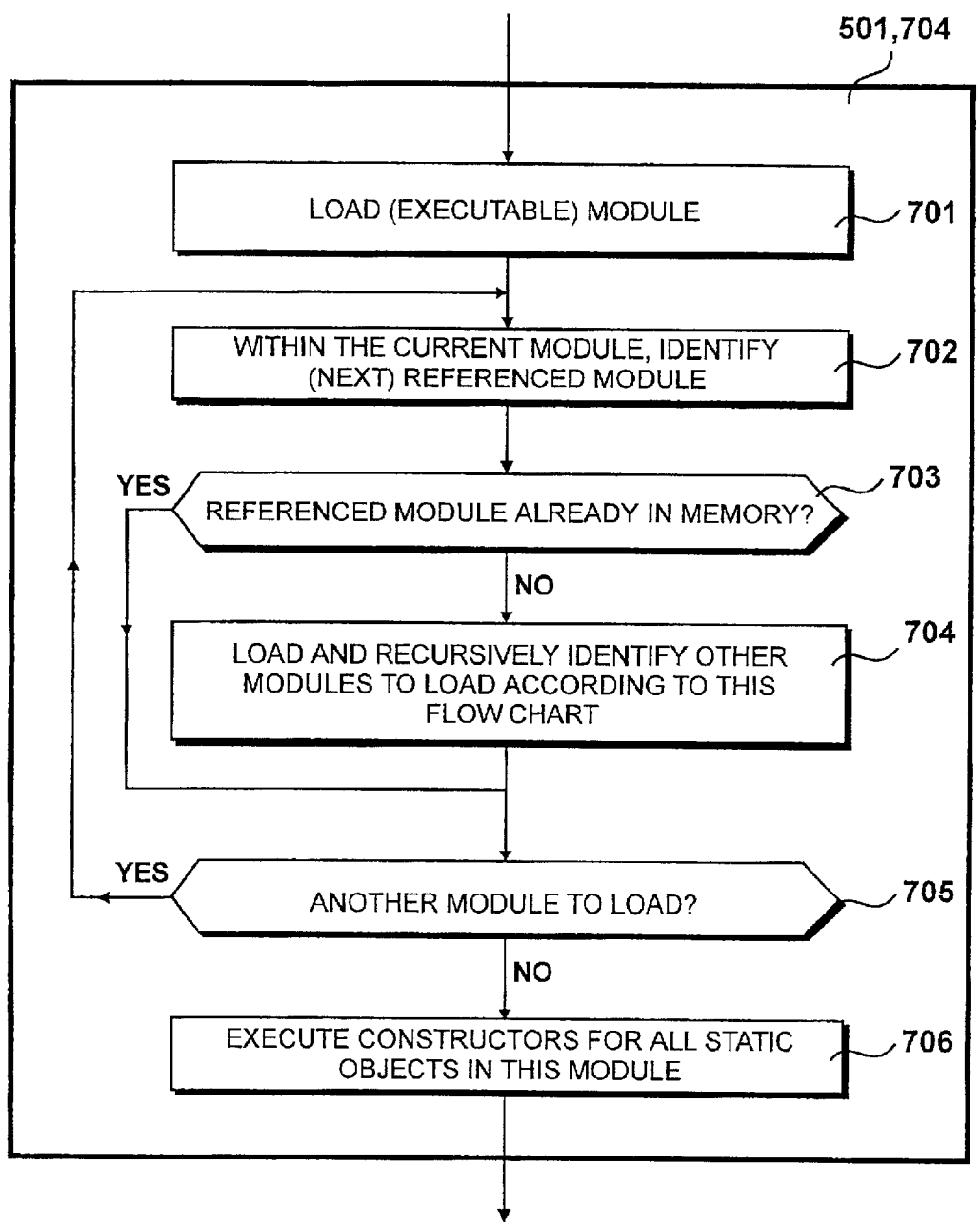
FIG. 7 details the step of loading all application modules shown in FIG. 5.

The step 501 of loading all application modules, initially shown in FIG. 5, is summarised in FIG. 7. When the application first starts, the initialisation manager 606 includes an empty initialisation list. When executed, the steps shown in FIG. 7 result in this list being filled.

The actions of the steps shown in FIG. 7 are performed in accordance with known activities of operating system application loading procedures. However, the existence of the registration object 610 in each module causes these steps, nevertheless, to form a part of the invention. When step 701 is first encountered, the executable module 605 is loaded. At step 702, the first other module referenced inside the executable module is identified. At step 703 a question is asked as to whether this module is already loaded. If so, control is directed to step 705. Alternatively, at step 704, this referenced module is loaded, and the steps of FIG. 7 are executed for that module recursively. At step 705 a question is asked as to whether another module is referenced inside the present module. If so, control is directed to step 702, and the next referenced module is loaded as necessary. Alternatively, once all referenced modules within the present module have been considered, control is directed to step 706.

Within each of the application modules there is a registration object 610. The loading process automatically executes constructors for all the statically declared objects in each module. This occurs at step 706, as a result of standard operating system procedures. Each registration object's constructor contains instructions to add the module to the initialisation list, along with its dependencies. This occurs before main application processing begins. As a result of the recursive execution of the steps of FIG. 7, all modules will have registered their existence and their dependencies, and the initialisation list 608 will have been filled. The order of the initialisation list at this stage is not important.

FIG. 8

An edited example of the source code for a module containing a registration object is shown in FIG. 8. The source code is written in C++, but defines the actions of events that occur during the loading of a module which may be implemented in binary processor instructions or any other appropriate instruction medium, and which may be stored on a hard disk, optical disk, or transferred as a stream over a network to facilitate an initialisation process. Furthermore, the example in FIG. 8 is heavily edited to convey the essence of the invention. Proper engineering practice will result in these features being placed in several files, including header files, and a source code file dedicated to initialisation functionality alone, as will be appreciated by those skilled in the art.

In the source code listing, a registration object 610 is declared at 801. Because this is declared outside any function or other type of structure, it is static. That is to say, it exists from the time the module is loaded to the time the module is unloaded. At 802 a constructor for the template class invoked at 801 is defined. The constructor for a static object is called automatically by the loading process at step 706. Thus, even before the main application starts, the constructor for each module is called. Any instructions may be placed here, and to implement the invention, a function, addDependency( ) is called. Its argument, contained in brackets, defines an additional dependency for the present module. The constructor shown in this example has three lines of code, each defining a dependency. Thus, as a result of executing these three lines of code, an entry will have been made in the initialisation list equivalent to:

foo→database, osal, initialize meaning that module foo is dependent upon modules database, osal and initialize.

For completeness in this example, code for the performinitialize( ) 803 and performFinalize( ) 804 functions is also shown, resulting in compiled functions 611 and 612 shown in FIG. 6.

FIG. 9

Figure 9:
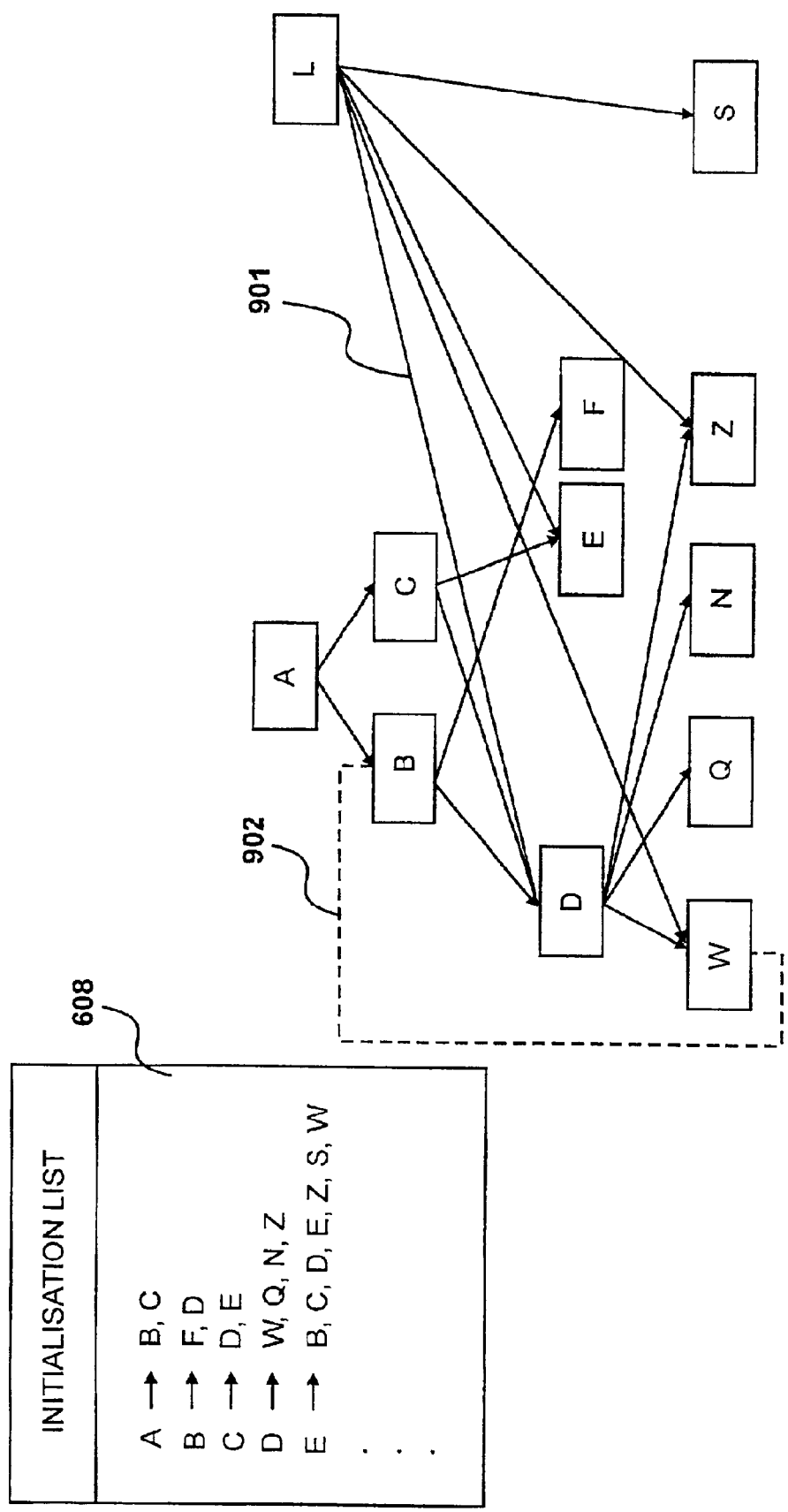
FIG. 9 details an example of the initialisation list shown in FIG. 6.

The initialisation list 608 is illustrated in FIG. 9. An extract of the dependencies is shown, not including all eighty modules, and naming each module A, B, C and so on, for convenience. The equivalent dependency graph for this small number of modules is shown at 901. Even this small fragment of twelve modules illustrates the complexity problem. In reality, the relationships are in the region of eighty or ninety modules and potentially, several hundred. A further difficulty may arise in that a cyclic dependency may exist, as shown at 902. This can be written as:

B→D→W→B

If such a situation exists it needs to be identified, as it is not possible to correctly initialise an application that includes this kind of configuration.

FIG. 10

Figure 10:
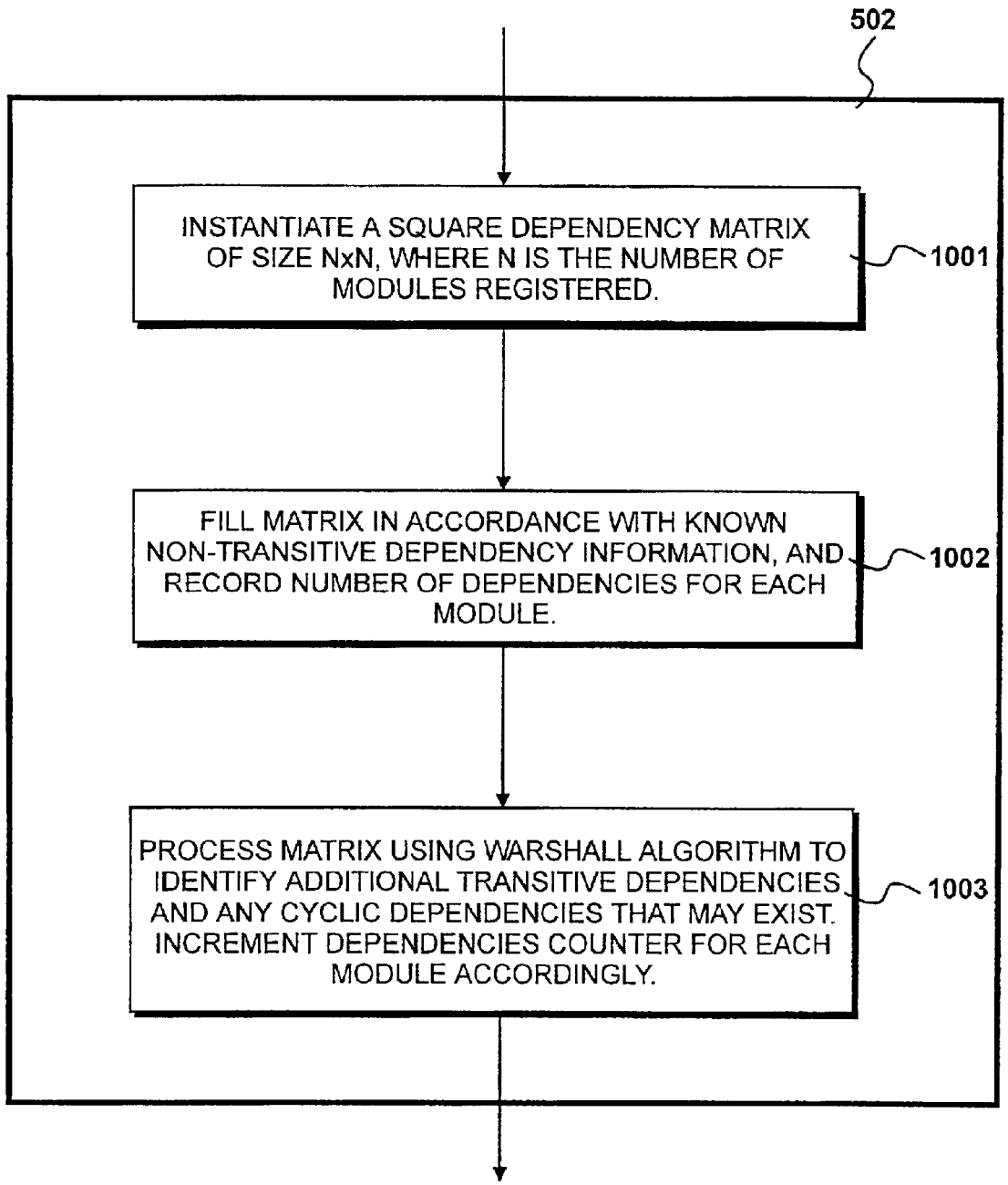
FIG. 10 summarises the step of processing dependencies shown in FIG. 5, including a step of filling a dependency matrix and a step of processing the dependency matrix.

The step 502 of processing dependencies, shown in FIG. 5, is detailed in FIG. 10. At step 1001 a square dependency matrix is created. It comprises an array of N by N locations, where N is the number of modules registered in the initialisation list 608. Each of the locations in the matrix can take the value of TRUE or FALSE. Each row in the matrix defines dependency information for a single module. Thus, the row for module A, has locations set at TRUE or FALSE in each of the columns corresponding to B, C, D and so on. Initially the dependency matrix is all clear. At step 1002 the known dependency information from the initialisation list is used to set the entries in each column accordingly. Additionally, the number of dependencies for each module is recorded.

The dependency information provided by the initialisation list is non-transitive. If module A is dependent upon module B and module B is dependent upon module C, then the fact that module A is ultimately dependent upon module C is not recorded. This type of indirect dependency is known as a transitive dependency. At step 1003 an algorithm known as the Warshall algorithm is used to set locations in the matrix in accordance with transitive dependencies. Cyclic dependencies are also detected. The number of dependencies recorded for each module is increased accordingly. At the end of step 1003, the dependency matrix includes transitive and non-transitive dependencies, and dependency totals for each module that include both types of dependencies. If, as a result of the steps shown in FIG. 10, a cyclic dependency is found, this results in question 503 in FIG. 5 being answered in the negative.

FIG. 11

Figure 11:
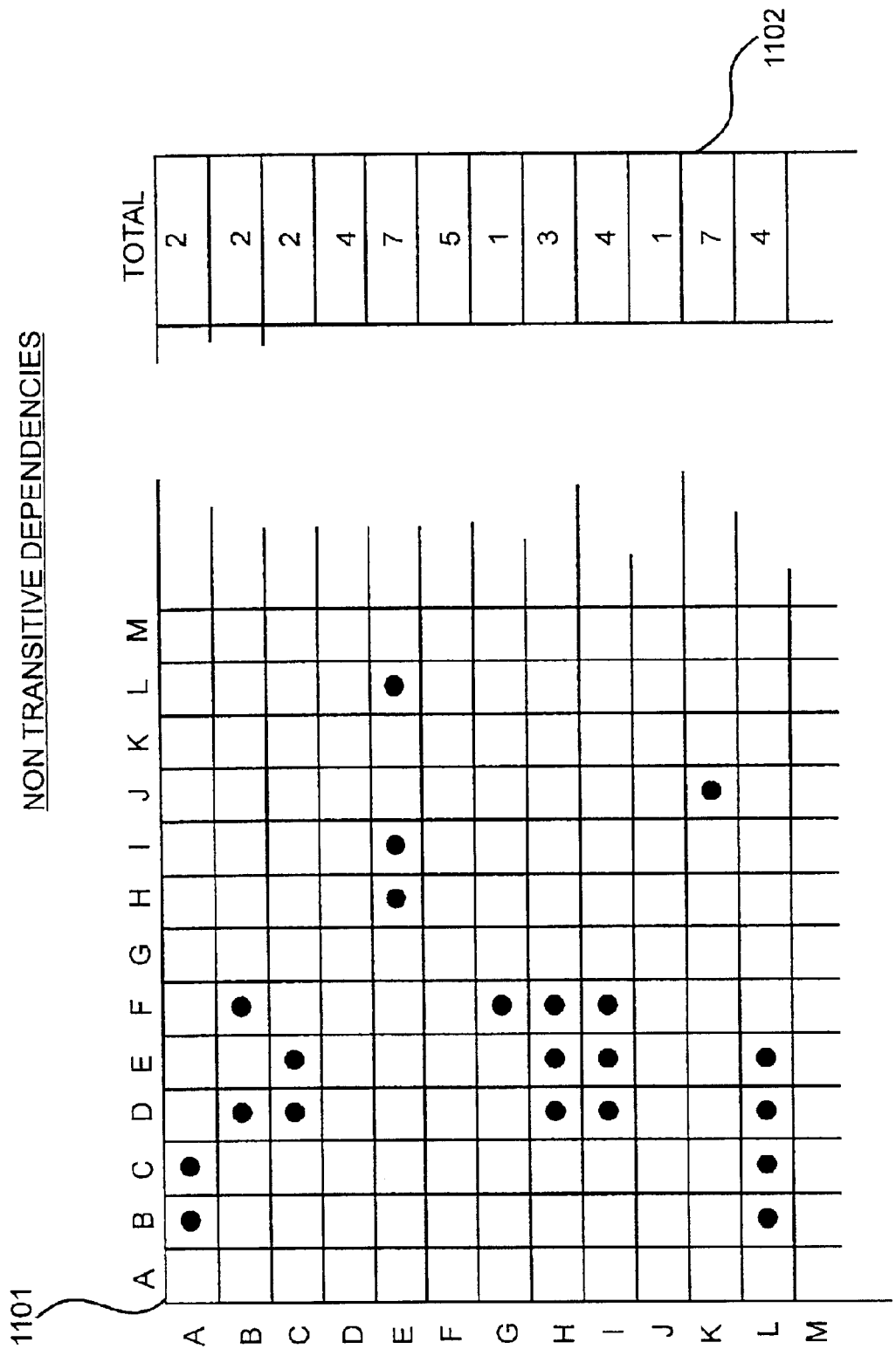
FIG. 11 illustrates the result of the step of filling a dependency matrix shown in FIG. 10.

The state of the dependency matrix after the completion of step 1002 in FIG. 10, is illustrated in FIG. 11. Each row of the dependency matrix 1101 records the non-transitive dependencies defined by the initialisation list 608 shown in FIG. 9. A set of dependency totals 1102 for each module is also shown. The illustration is an example only. In practice the number of rows and columns is much higher.

FIG. 12

Figure 12:
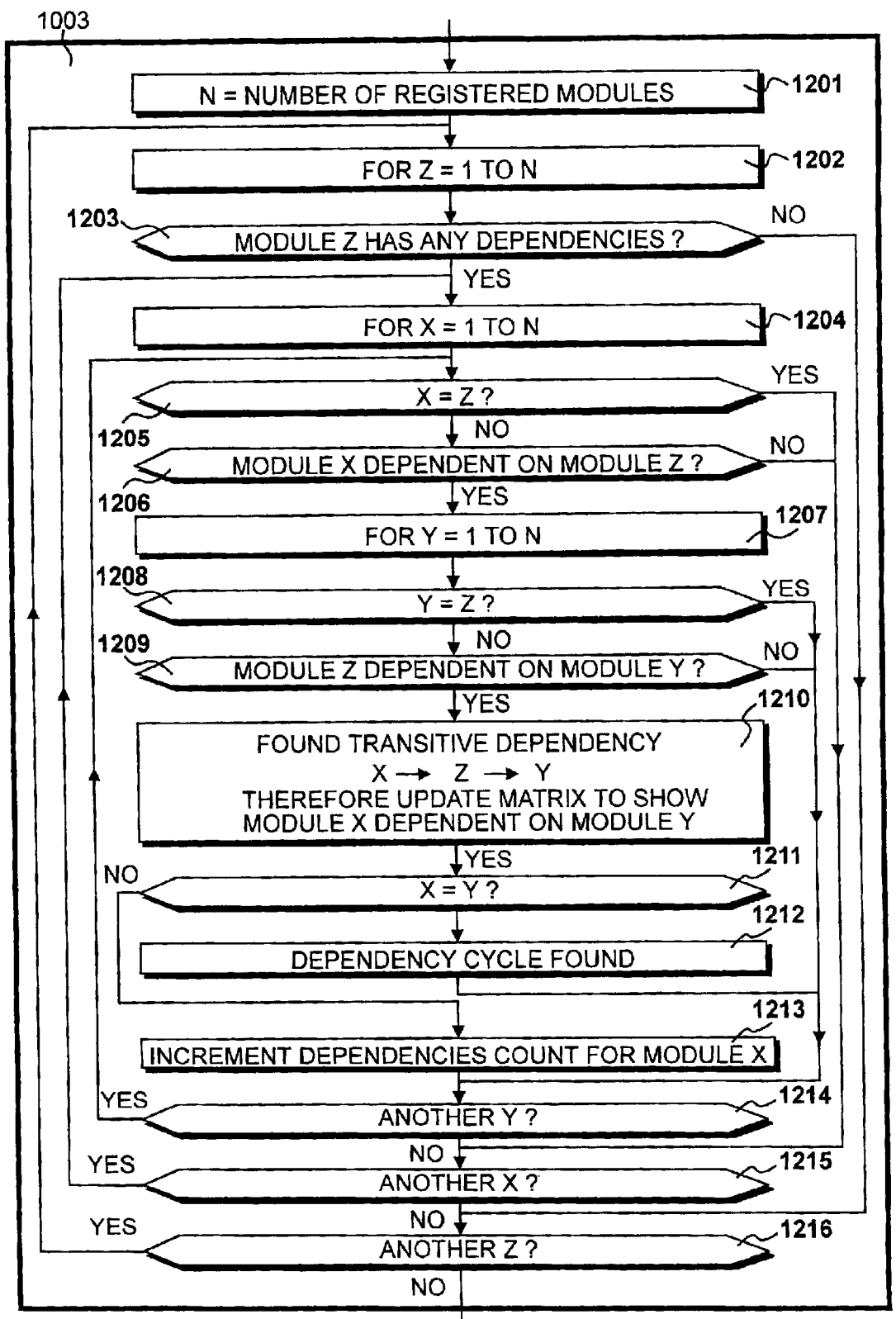
FIG. 12 details the step of processing the dependency matrix, shown in FIG. 10.

The Warshall procedure applied in step 1003 in FIG. 10 is detailed in FIG. 12. This algorithm is used in graph theory, where the condition of transitive closure provided by the process can provide information about relationships between sets of connected vertices. At step 1201 a variable N is set to equal the number of registered modules. At step 1202 an outer loop is commenced, indexed by a variable Z. At step 1203 a question is asked as to whether the module whose dependencies are represented by row Z has any dependencies at all. If answered in the negative, control is directed to step 1216. This exclusion of modules from the outer loop can save valuable processing time. At step 1204 a middle loop is initiated, indexed by the variable X. At step 1205 a question is asked as to whether X is equal to Z. If so, there is no need to process this level any further, as it would only consider a situation where the module is dependent upon itself. At step 1206, it is known that X and Z are different, and a question is asked as to whether the module indexed at row X is dependent upon the module indexed at column Z. This condition is indicated by the matrix at the confluence of this row and column being set to a Boolean value of TRUE. The question may be expressed in the form:

$$X \rightarrow Z?$$

If this is not true, then there is no need to consider module X in this loop any further, and control is directed to step 1215. If module X is dependent upon module Z, control is directed to step 1207.

At step 1207, an inner loop is set up, indexed by a variable Y. At step 1208 a question is asked as to whether Y is equal to Z. If so, this indicates a consideration as to whether a module is dependent upon itself, which is not considered of interest. In this case, control is directed to step 1214 and another value for Y is taken for the inner loop. Alternatively, if Y 10 and Z are different, a question is asked as to whether module Z is dependent upon module Y:

$$Z \rightarrow Y?$$

If this condition does not exist, control is directed to step 1214, and another value for Y is taken. Alternatively, control is directed to step 1210. At step 1210 two conditions are known, from which a conclusion may be drawn:

$X \rightarrow Z$ and $Z \rightarrow Y$ so $X \rightarrow Z \rightarrow Y$ and therefore $X \rightarrow Y$ At step 1210 a transitive dependency has been identified from an analysis of the dependency matrix. In the matrix, the location at row X and column Y is set to a value of TRUE. At step 1211 a question is asked as to whether X is equal to Y, which would indicate a dependency cycle of the form:

$$X \rightarrow Z \rightarrow X$$

If this is the case, a note is made that a dependency cycle has been found, and control is directed to step 1214. Alternatively, if the dependency is non-cyclic, the number of modules that module X is dependent upon is incremented. Thereafter, the inner, middle and outer loops are continued at steps 1214, 1215 and 1216 respectively.

FIG. 13

Figure 13:
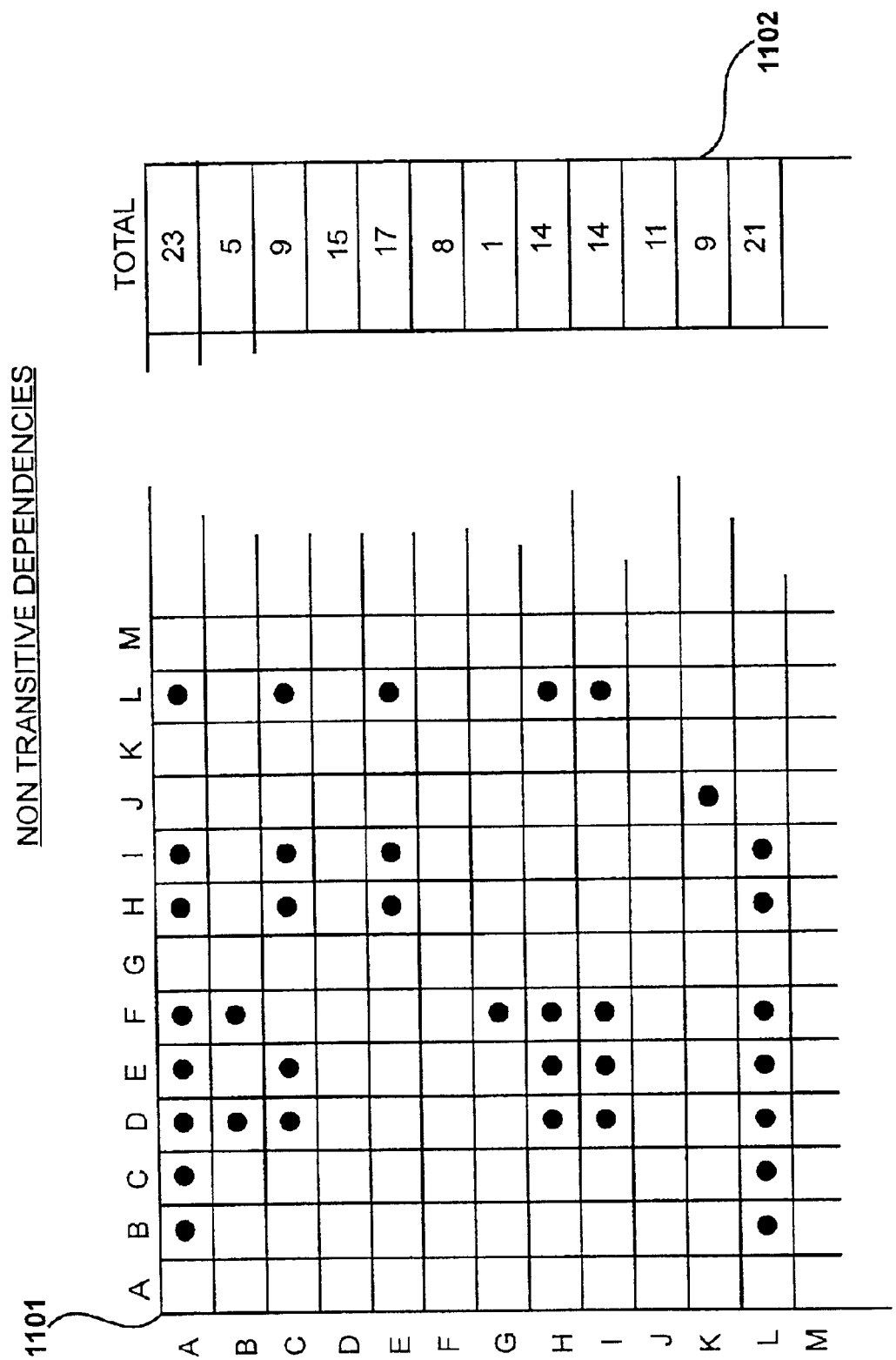
FIG. 13 illustrates the result of processing the dependency matrix as summarised by the steps shown in FIG. 12.

Once the algorithm of FIG. 12 has completed, all transitive and non-transitive dependencies will have been recorded by the dependency matrix 1101, and the total number of dependencies recorded for each module. An example of the type of result that can be expected is shown in FIG. 13, based upon the preceding example shown in FIG. 11. Here it will be noted that the number of TRUE entries in the matrix has increased, and the dependency counts also have increased for most of the modules.

FIG. 14

Processing at this stage has now reached step 505 in FIG. 5, or, if a cycle was found, step 504. With the number of dependencies, direct and indirect, known for all the modules, it is now possible to sort them into dependency order. At step 505, this sorting process is performed, resulting in the creation of an initialisation schedule 609, as illustrated in FIG. 14. At the top of the list is the module with the least dependencies. Initialisation may proceed in the order defined by the schedule, and this is performed at step 506 in FIG. 5.

FIG. 15

Figure 15:
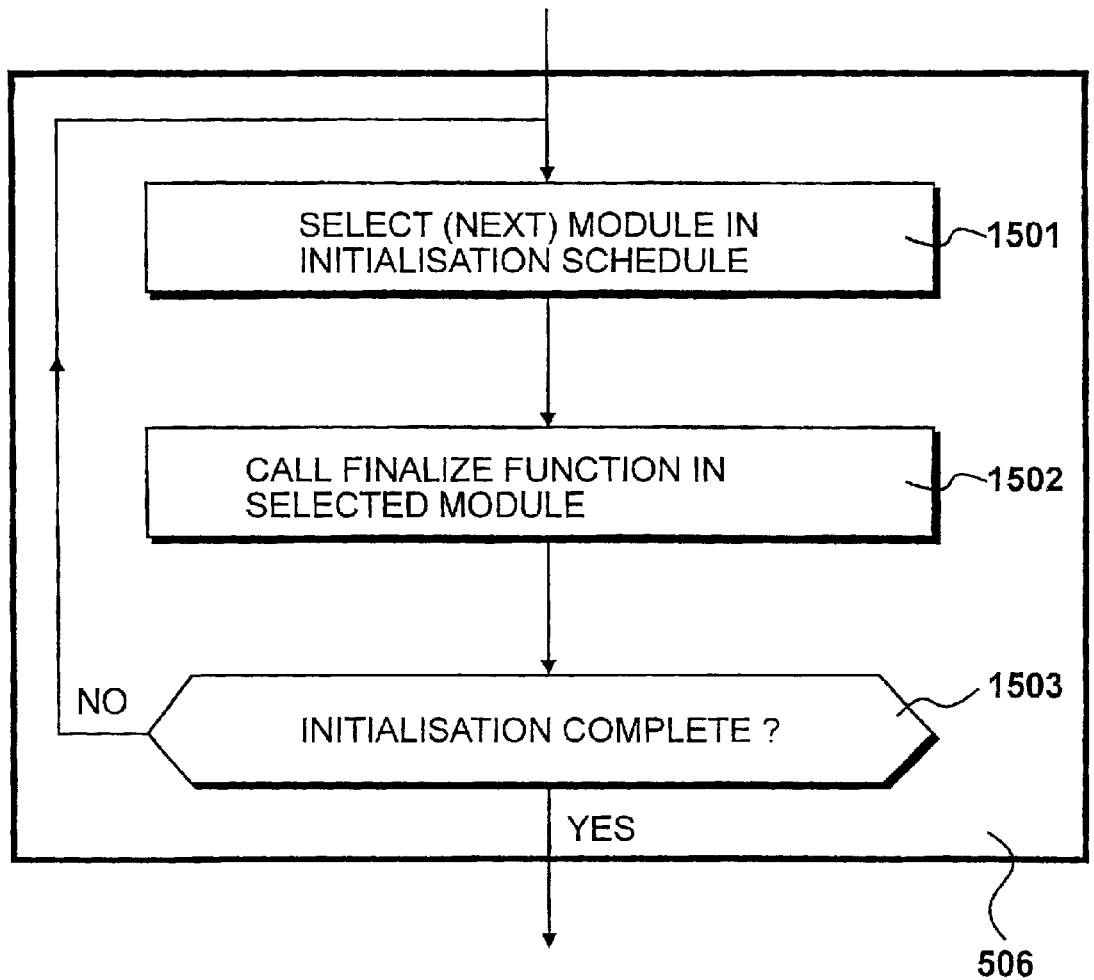
FIG. 15 details the step of initialising modules shown in FIG. 5.

The initialisation procedure performed at step 506 is detailed in FIG. 15. At step 1501 the first module in the initialisation schedule 609 is selected. At step 1502, the initialisation function 611, 803, is called for the selected module. This has the result that the data 614 in the module, upon which correct module functionality depends, is initialised before other modules attempt to use the operational functions 613. At step 1503 a question is asked as to whether initialisation is complete. If not, control is directed to step 1501, where the next module in the initialisation schedule 609 is selected. All the application modules are thereby initialised in the order required by their dependency. Dependency characteristics for each module may vary over time, as new features are added and improved, without causing difficulty in identifying the correct initialisation order for the application.

The application modules may be augmented by additional modules at any time while it is running. Modules may be dynamically loaded in response to specific user requirements. It is even possible that a user may download a module from the Internet and use it with the application without stopping and restarting the application. A typical application of this is in import and export filters for different file formats. In image processing, for example, there are many formats in which image data can be stored, including several varieties of compressed image format, such as JPEG. A comprehensive set of filters for all image formats could take up a significant amount of main memory, and also take some considerable time to load and initialise if they were all considered as application modules. A solution to this difficulty is in loading such modules on demand. For example, when a user first requires to export to a JPEG format file, a module including JPEG compression instructions can be loaded. It then remains in memory, as it is likely that the user, having used this facility once, will want to use it again before the application is shut down.

Modules loaded in this way are sometimes referred to as plugins, as they can implement new functionality for the application simply by the addition of one or two modules, rather than a complete re-installation of the application. Additional use of plug-ins includes image processing algorithms, lens effects, image blur, colour correction and so on. The use of modules, both as standard application modules and in the form of plug-ins that are loaded on demand, is a powerful method of enhancing application functionality, and tailoring it to individual user requirements.

The initialisation framework that has been described can be extended to include all modules loaded at any time during the application's execution. In FIG. 2, at step 204, the user performs various actions, including actions that require the loading of plug-in modules.

FIG. 16

Figure 16:
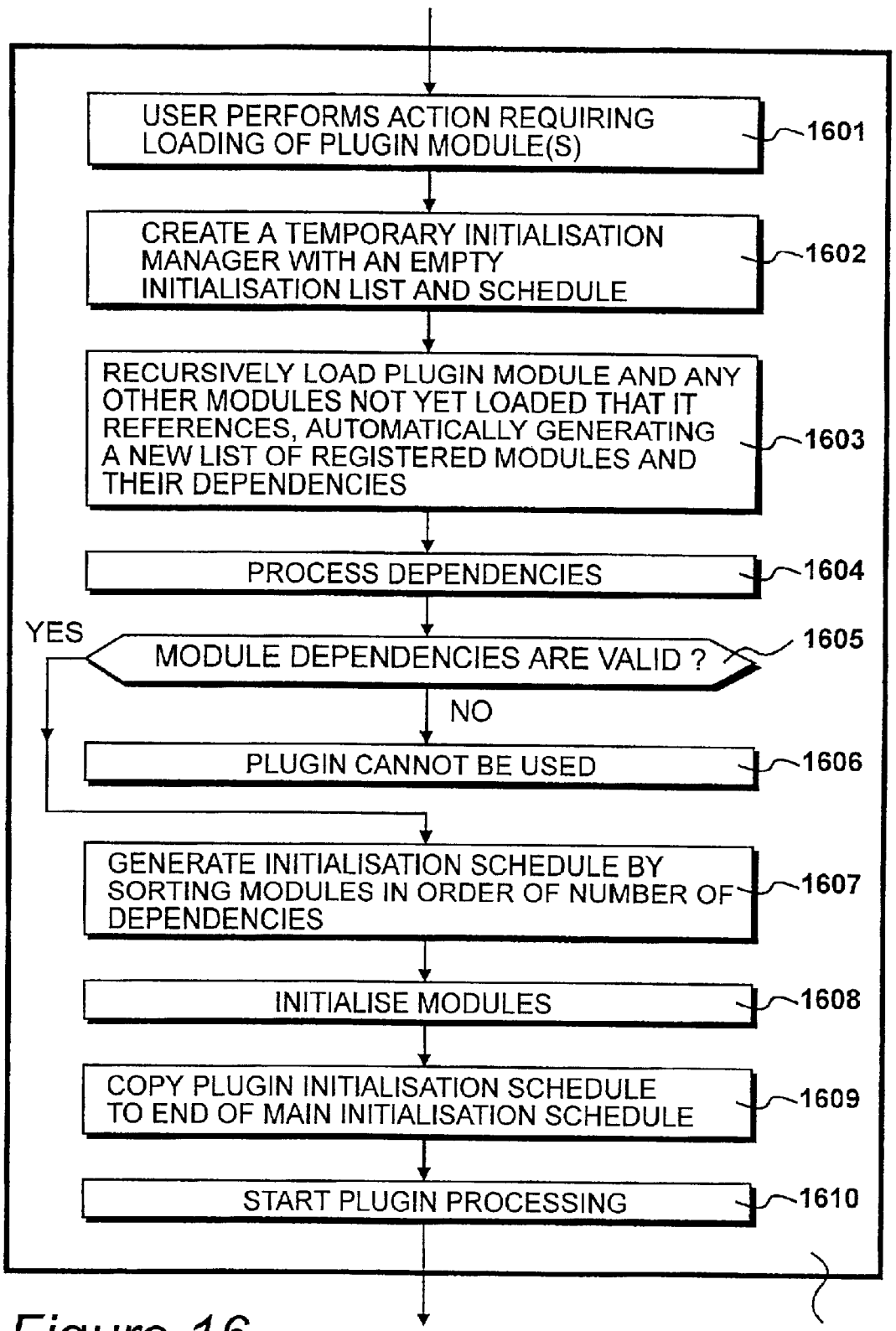
FIG. 16 details the step of operating the application shown in FIG. 2.

The steps that occur when plug-ins are loaded are detailed in FIG. 16. At step 1601 the user performs an action requiring the use of a plug-in module. For example, the user decides to save a file in the JPEG format. At step 1602, a temporary initialisation manager is instantiated, having an empty initialisation list and schedule. At step 1603 the plug-in module or modules are recursively loaded in accordance with the process described in detail with reference to FIG. 7. A new initialisation list is created, containing only those modules that have not been initialised, even when the plug-in module has a dependency upon modules that were loaded as part of the application at step 203.

At step 1604 new dependencies are processed as previously described with reference to FIGS. 10 to 13. At step 1605 a question is asked as to whether the module dependencies are valid. If so, control is directed to step 1607. If a dependency cycle has been found, control is directed to step 1606, and the plug-in cannot be loaded. An error message is supplied to the user, and, preferably, this information is also supplied back to the vendor of the plug-in for debugging. At step 1607 an initialisation schedule is created, by sorting the modules in order of least dependent, as shown in FIG. 14. At step 1608 the plug-in modules are initialised, as detailed in FIG. 15.

At step 1609 the initialisation schedule generated by the newly instantiated initialisation manager is appended to the end of the main initialisation schedule 609. At step 1610 plug-in processing can begin.

FIG. 17

Figure 17:
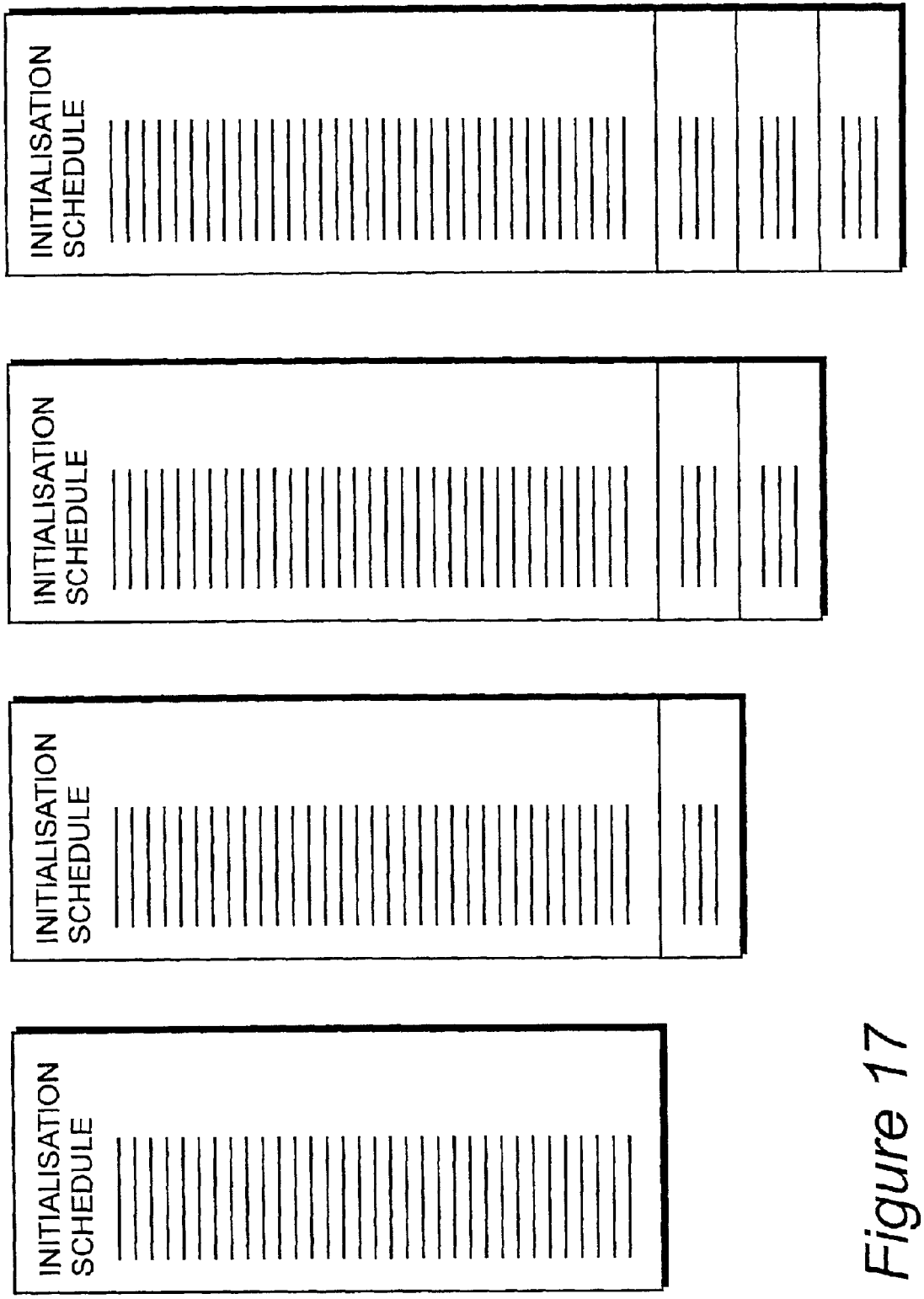
FIG. 17 illustrates the effect of loading plug-ins on the initialisation schedule as the application is used.

The effect of loading plug-ins on the initialisation schedule 609 is illustrated in FIG. 17. Each time a new set of modules is loaded, the temporary initialisation schedule created as a result of this process is added to the end of the existing initialisation schedule. This has no effect upon the initialisation of plug-in modules, as their schedules are only added to the main one after their initialisation has been completed. The purpose of recording initialisations in this way is to ensure that finalisation can be performed in a similarly rigorous way.

Finalisation of modules can be as important as initialisation. When an application closes down, various clean-up operations take place. If a function starts behaving incorrectly, because a module that it relied upon has not been closed down correctly, then it is possible for this to cause serious problems. When an application is closed, usually some data is stored to disk. In many cases, incorrect finalisation can cause an application to crash, thus losing this data, and at the very least causing some consternation for the user.

FIG. 18

Figure 18:
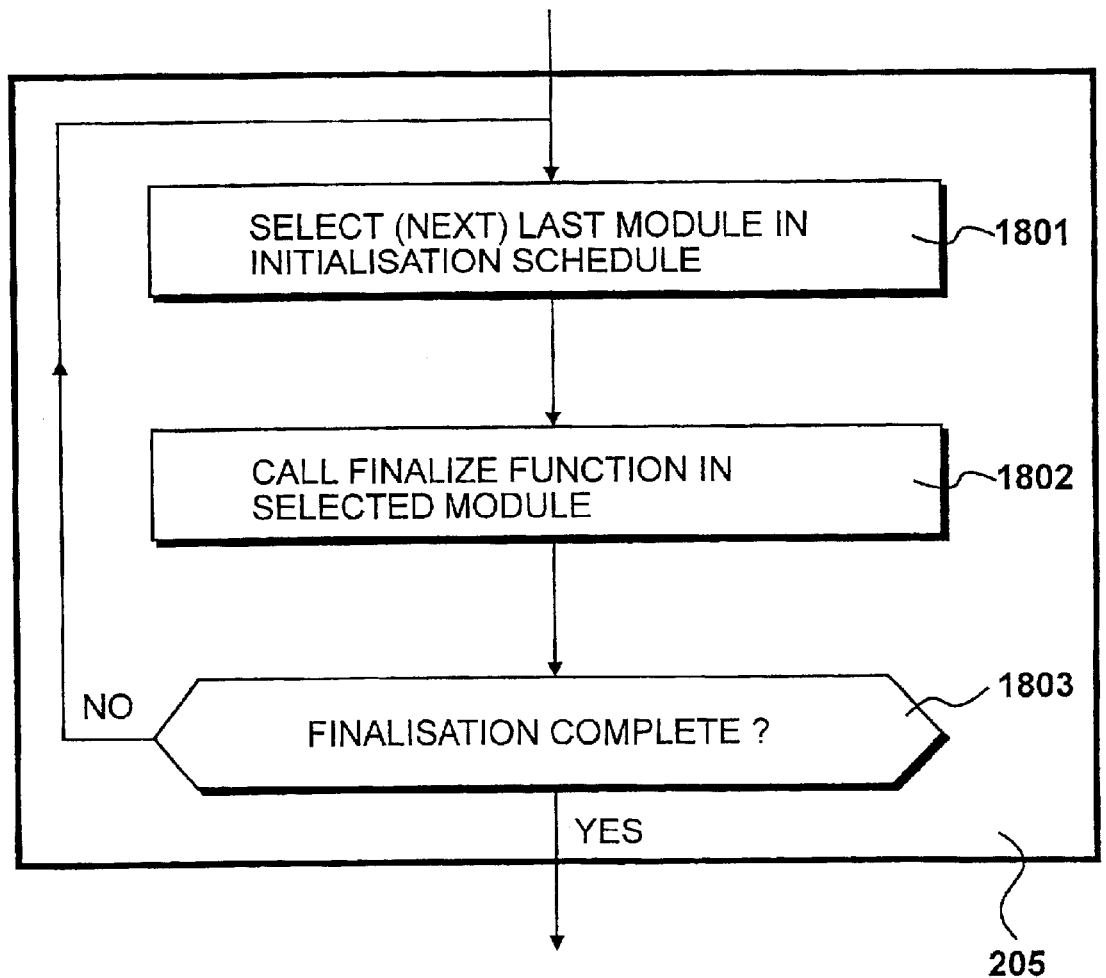
FIG. 18 details the step of closing down the application shown in FIG. 2.

The correct order of module finalisation is the reverse of module initialisation. This is the reason for appending all subsequent plug-in initialisations to the main initialisation schedule. Finalisation, performed in step 205 in FIG. 2, is detailed in FIG. 18. At step 1801 the last module in the initialisation schedule 609 is selected. At step 1802 the finalisation function 612, 804, is called in the selected module. At step 1803 a question is asked as to whether finalisation is complete. If not, control is directed to step 1801, and the next last module is selected. This sequence repeats until the first module, at the top of the schedule is reached. Thereafter no more finalisation is required and the application closes.

The loading of modules performed at step 501, when the application is first loaded, builds the initialisation list 608 automatically as a result of executing the constructor 802 for an registration object 610, 801, in each application module. Steps 502 to 507 are not automatic, and must be invoked as the first operation performed by the application when the operating system has completed the loading process.

FIG. 19

An application written in C++ usually has its starting point defined in a main( ) function. This may typically be found in a file called main.cpp. Key features of the source code in this file are shown in FIG. 19. The file main.cpp defines a module called main, and this therefore has a registration object and constructor as shown in FIG. 8 for other modules. The feature of relevance in FIG. 19 is shown at 1901. An initialisation object ig is instantiated between pairs of curly braces at 1902 and 1903. At 1901, the ig object is created, calling instructions for its constructor. The constructor contains a call to a function that performs the initialisation steps 502 to 506 shown in FIG. 5. At 1903 the ig object moves out of scope, and it's destructor function is called, thereby invoking instructions for finalisation. Between 1901 and 1903, the main( ) function contains the main application functionality.

FIG. 20

The constructor for the Initguard class, invoked by the declaration at 1901 in FIG. 19, is detailed in FIG. 20. Here it can be seen that a function, located in the initialisation manager module 606, is called. This function performs the functionality of steps 502 to 506 shown in FIG. 5.

FIG. 21

An example of code used when loading plug-in modules is shown in FIG. 21. A pair of curly braces 2101 and 2102 defines the scope of a re-initialisation object rig. The constructor for this object increments a reference counter and a temporary empty initialisation list and schedule are created as a result of this declaration. It is possible for re-initialisation functionality to be nested, although this is not usually the case. This corresponds to step 1602 in FIG. 16. Two dlopen( ) functions load the plug-ins "Plugin1" and "Plugin2". Loading of these modules results in the temporary initialisation list of rig being filled, in accordance with step 1603 in FIG. 16. As rig moves out of scope at 2102, its destructor is called. This is shown in FIG. 22. This calls a function, ReInitManager.inititialize( ), within the initialisation manager module 606, which has the effect of performing steps 1604 to 1609 shown in FIG. 16.

The steps summarised by FIG. 5 and detailed thereafter, and also in FIG. 16, describe events that occur within an initialisation framework. Finalisation is considered part of this framework. The framework exists by virtue of certain data structures being present in the application modules, and any plug-ins that the application requires to use. During the course of application module development, the initialisation manager 606 remains fixed in its operation. Other modules, of course, may vary, as source code in C++ or other language becomes debugged, modified or improved. The engineers responsible for the development of a particular module must write the initialisation and finalisation functions 803 and 804 themselves, as these are entirely dependent upon the intended functionality of the module. However, the declaration 801 of the initialisation object and the contents of its constructor 802 may be generated automatically in response to a list of dependencies supplied by an engineer. A text processing utility, such as sed, may be used to automatically generate detailed code, thus leaving the engineers to concentrate on more creative aspects of the module's design.

What is claimed is:

1. Apparatus for processing data, comprising processing means and memory means for storing data and instructions for processing said data, wherein said memory means includes application instructions and data that define an initialisation manager; and a plurality of application modules;

each of said application modules includes a registration object for registering dependency of said module upon others of said application modules, to said initialisation manager;

each said application module further includes operational instructions defining operations of said module used by other modules; and at least two of said application modules include initialisation instructions for initialising data affecting execution of said operational instructions;

said initialisation manager includes instructions for performing the steps of:

(a) processing said registered module dependencies to identify a dependency count for each module;

(b) generating an initialisation schedule by sorting the module order according to the number of dependencies; and (c) calling said initialisation instructions in the order defined by said initialisation schedule.

2. Apparatus according to claim 1, wherein said registration object for a module includes registration instructions that are called automatically as a result of loading the module.

3. Apparatus according to claim 1, wherein said initialisation manager includes an initialisation list that records module dependencies.

4. Apparatus according to claim 1, wherein said processing step (a) comprises steps of (a1) creating a dependency array that defines non-transitive dependencies;

(a2) processing said dependency array to identify transitive dependencies; and (a3) recording the total number of dependencies for each registered module.

5. Apparatus according to claim 1, wherein said initialisation manager further includes instructions for initialising plug-in modules loaded after step (c), including the steps of:

(d) processing registered plug-in module dependencies to identify a dependency count for each plug-in module;

(e) generating an additional initialisation schedule by sorting the newly registered plug-in modules into order of number of dependencies;

(f) calling initialisation instructions in said plug-in modules in an order defined by said additional initialisation schedule; and (g) extending the existing initialisation schedule by adding said additional initialisation schedule.

6. Apparatus according to claim 1, wherein at least two of said application modules include finalisation instructions for finalising data affecting operational instructions.

7. Apparatus according to claim 6, wherein said initialisation manager includes instructions for finalising modules by calling module finalisation instructions in the reverse of the order defined by the initialisation schedule.

8. Apparatus according to claim 1, wherein one of said application modules includes the main application instructions, from which a call is made to invoke processing steps (a), (b) and (c), performed by the initialisation manager.

9. Apparatus according to claim 1, wherein said memory means also includes automatic code generating instructions, for generating source code for an initialisation object in a module.

10. Apparatus according to claim 1, wherein said application is an operating system.

11. A method of processing data in a processing system comprising processing means and memory means for storing data and instructions for processing said data, wherein said memory means includes application instructions and data that define an initialisation manager; and a plurality of application modules;

each of said application modules including a registration object for registering dependency of said module upon others of said application modules, to said initialisation manager;

each said application module further includes operational instructions defining operations of said module used by other modules; and at least two of said application modules include initialisation instructions for initialising data affecting execution of said operational instructions;

said initialisation manager performing the steps of:

(a) processing said registered module dependencies to identify a dependency count for each module;

(b) generating an initialisation schedule by sorting the module order according to the number of dependencies; and (c) calling said initialisation instructions in the order defined by said initialisation schedule.

12. A method according to claim 11, wherein said registration object for a module includes registration instructions that are called automatically as a result of loading the module.

13. A method according to claim 11, wherein said initialisation manager records said module dependencies in an initialisation list.

14. A method according to claim 11, wherein said processing step (a) comprises steps of (a1) creating a dependency array that defines non-transitive dependencies;

(a2) processing said dependency array to identify transitive dependencies; and (a3) recording the total number of dependencies for each registered module.

15. A method according to claim 11, wherein said initialisation manager further performs steps for initialising plug-in modules loaded after step (c), which include the steps of:

(d) processing registered plug-in module dependencies to identify a dependency count for each plug-in module;

(e) generating an additional initialisation schedule by sorting the newly registered plug-in modules into order of number of dependencies;

(f) calling initialisation instructions in said plug-in modules in an order defined by said additional initialisation schedule; and (g) extending the existing initialisation schedule by adding said additional initialisation schedule.

16. A method according to claim 11, including executing finalising instructions contained in at least two of said application modules.

17. A method according to claim 16, wherein said initialisation manager calls said module finalising instructions in the reverse of the order defined by the initialisation schedule.

18. A method according to claim 11, including making a call from the main application function to invoke processing steps (a), (b) and (c), prior to main application execution.

19. A method according to claim 11, including executing automatic code generating instructions, thereby generating source code for an initialisation object in response to specified module dependencies.

20. A method according to claim 11, wherein said application is an operating system.

21. A data structure defined upon a machine readable medium, comprising an initialisation manager and a plurality of application modules; wherein each of said application modules includes a registration object for registering dependency of said module upon others of said application modules, to said initialisation manager;

each said application module further includes operational instructions defining operations of said module used by other modules; and a plurality of said application modules include initialisation instructions for initialising data affecting execution of said operational instructions;

said initialisation manager includes instructions for performing the steps of:

(a) processing said registered module dependencies to identify a dependency count for each module;

(b) generating an initialisation schedule by sorting the module order according to the number of dependencies; and (c) calling said initialisation instructions in the order defined by said initialisation schedule.

22. A data structure according to claim 21, wherein said registration object for a module includes registration instructions that are called automatically as a result of loading the module.

23. A data structure according to claim 21, wherein said initialisation manager includes an initialisation list that records module dependencies.

24. A data structure according to claim 21, wherein said processing step (a) comprises steps of (a1) creating a dependency array that defines non-transitive dependencies;

(a2) processing said dependency array to identify transitive dependencies; and (a3) recording the total number of dependencies for each registered module.

25. A data structure according to claim 21, wherein said initialisation manager further includes instructions for initialising plug-in modules loaded after step (c), including the steps of:

(d) processing registered plugin module dependencies to identify a dependency count for each plugin module;

(e) generating an additional initialisation schedule by sorting the newly registered plugin modules into order of number of dependencies;

(f) calling initialisation instructions in said plugin modules in an order defined by said additional initialisation schedule; and (g) extending the existing initialisation schedule by adding said additional initialisation schedule.

26. A data structure according to claim 21, wherein at least two of said application modules include finalisation instructions for finalising data affecting operational instructions.

27. A data structure according to claim 26, wherein said initialisation manager includes instructions for finalising modules by calling module finalisation instructions in the reverse of the order defined by the initialisation schedule.

28. A data structure according to claim 21, wherein one of said application modules includes the main application instructions, from which a call is made to invoke processing steps (a), (b) and (c), performed by the initialisation manager.

29. A data structure according to claim 21, wherein said memory means also includes automatic code generating instructions, for generating source code for an initialisation object in a module.

30. A data structure according to claim 21, wherein said registered application modules are part of an operating system.

* * * * *